United States Patent [19]

Carmichael

[11] Patent Number: 5,261,728
[45] Date of Patent: Nov. 16, 1993

[54] QUICK RELEASE RESTRAINT DEVICE

[75] Inventor: Vickie J. Carmichael, New Lenox, Ill.

[73] Assignee: Vickie J. Holden, New Lenox, Ill.

[21] Appl. No.: 797,631

[22] Filed: Nov. 25, 1991

[51] Int. Cl.5 ............................................. B60R 21/00
[52] U.S. Cl. .................................. 297/482; 297/466; 280/801 R
[58] Field of Search ................ 280/801, 805; 297/468, 297/482, 485, 466; 24/306, 442

[56] References Cited

U.S. PATENT DOCUMENTS

| | | | |
|---|---|---|---|
| 3,125,375 | 3/1964 | Bird et al. | 297/484 |
| 3,318,634 | 5/1967 | Nicholas | 297/482 |
| 3,747,171 | 7/1973 | Montague, Jr. | 24/306 |
| 4,004,583 | 1/1977 | Johnson | 297/468 |
| 4,139,215 | 2/1979 | Guitard et al. | 297/483 |
| 4,177,807 | 12/1979 | Ocel et al. | 297/468 |
| 4,203,167 | 5/1980 | Collins | 24/442 |
| 4,709,966 | 12/1987 | Parkinson et al. | 297/484 |
| 4,728,553 | 3/1988 | Daniels | 297/466 |
| 4,784,889 | 11/1988 | Daniels | 297/466 |
| 4,789,183 | 12/1988 | Wolfer | 297/466 |
| 4,925,246 | 5/1990 | Corcoran | 297/464 |
| 4,939,824 | 7/1990 | Reed | 297/482 |
| 5,050,906 | 9/1991 | Kneip | 280/805 |
| 5,075,933 | 12/1991 | Kemper | 24/442 |
| 5,131,118 | 7/1992 | Breeher | 24/306 |

Primary Examiner—Margaret A. Focarino
Assistant Examiner—Paul Dickson
Attorney, Agent, or Firm—Ernest Kettelson

[57] ABSTRACT

A quick release restraint device for such uses as restraining prisoners being transported in police vehicles, which includes a mechanism to quickly release the restraint device in the event it is necessary to rapidly move the restrained prisoner out of the vehicle in the case of an accident or other emergency wherein his life or safety may be endangered. The restraint comprises a strap member having a buckle at one end to secure to the handcuffs of the prisoner, and a releasable loop at the other end to secure to an anchoring member of some kind permanently affixed to the vehicle. The releasable loop is doubled back, with the doubled back portion received and held in an elongated sleeve which surrounds a portion of the strap. The releasable loop is held in place as long as the doubled back portion is within the elongated sleeve, but it may be rapidly undone to release the prisoner by pulling the doubled back portion out of the sleeve by a hand grasp member which projects outwardly of the sleeve.

11 Claims, 3 Drawing Sheets

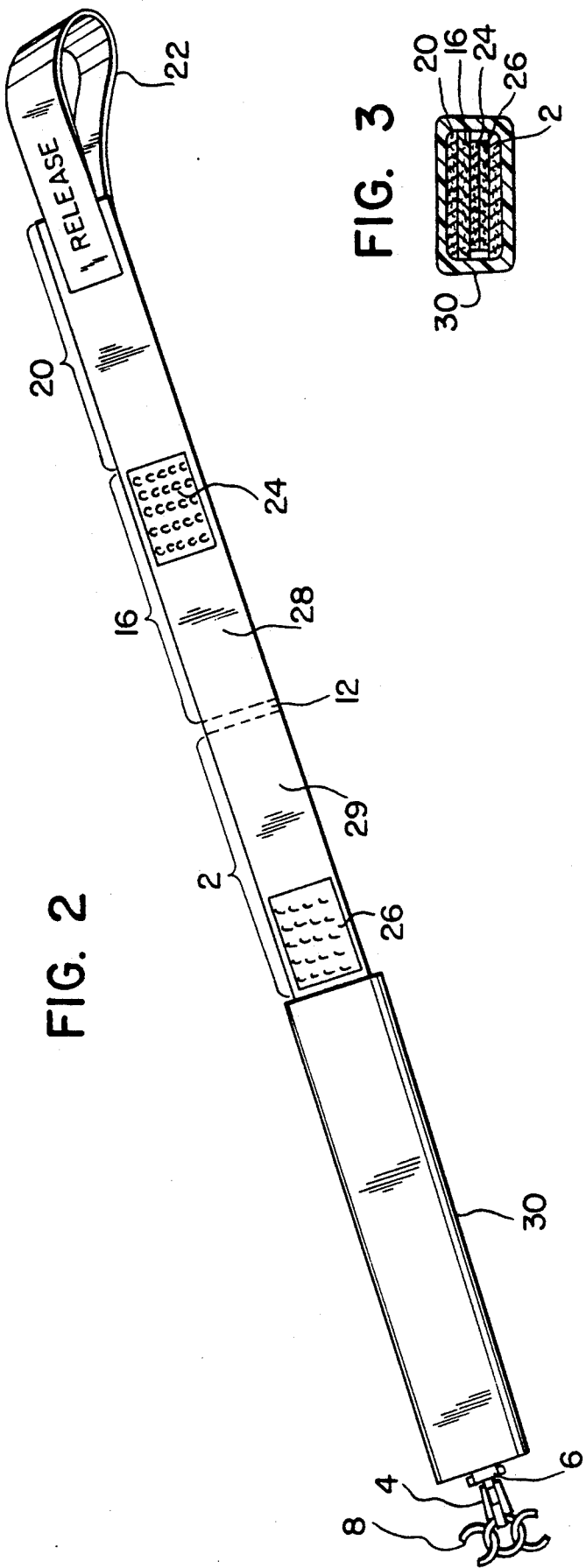

QUICK RELEASE RESTRAINT DEVICE

BACKGROUND OF THE INVENTION

This invention relates to restraint devices for such purposes as restraining prisoners being transported in police vehicles. In particular it relates to such devices which include some mechanism to release the restraint device quickly in the event of an accident or other emergencies wherein the life or safety of the prisoner would be threatened if he could not be removed rapidly.

Prior art devices in this field known to the inventor include those disclosed in the following U.S. patents.

U.S. Pat. No. 4,939,824 discloses a vehicle safety belt buckle cover which covers the buckle to make it more difficult for children to unbuckle the safety belt, the cover being releasably held in place by Velcro fastening strips whereby it can be released from the buckle by separating the Velcro fastening strips.

U.S. Pat. No. 4,925,246 discloses a prisoner restraint system which comprises a contoured seat back having channels to receive the arms of the prisoner, a central lower pocket to receive the cuffed hands of the prisoner, and a belt with a cinching handle detachably mounted to the seat belt latching mechanism for use in tightening the seat belt to press the prisoner into engagement with the contoured seat back.

U.S. Pat. No. 4,789,183 discloses a method and apparatus for restraining an individual which includes a strap bolted to the back of a seat and a buckle for connection to a prisoner's handcuffs behind his back to prevent him from working his cuffed hands toward the front.

U.S. Pat. No. 4,784,889 discloses a prisoner leg restraint comprising a strap around the legs of a prisoner seated in a police vehicle, and a belt connected to the strap around the prisoner's legs at one end, the opposite end of the belt with a buckle thereon being tossed out the door of the vehicle and trapped in place when the door is closed.

U.S. Pat. No. 4,728,553 discloses another prisoner leg restraint similar to that in U.S. Pat. No. 4,784,889 but in which the opposite end of the belt is connected to an anchor on the floor of the vehicle.

U.S. Pat. No. 4,709,966 discloses a child restraint harness having several straps and buckles to restrain a child in the seat of a vehicle in such a way that he can sit, or stand, and move within a limited range.

U.S. Pat. No. 4,177,807 discloses a restraining belt for patients in wheelchairs, stretchers or the like, comprising a strap to go around the upper body portion of a patient having Velcro fastening strips to releasably secure the strap in place.

U.S. Pat. No. 4,139,215 discloses an automobile seat belt in which an auxiliary latch is provided at a position which is readily accessible for emergency release of the seat belt.

U.S. Pat. No. 4,004,583 discloses a restraining device which comprises a strap having Velcro fastening segments at the ends, one end of the strap extending through the space between the car door and the door jamb, and an enlarged end to prevent pulling through the space when the door is closed.

U.S. Pat. No. 3,747,171 discloses a clasp for watchbands having Velcro type hook and loop connecting strips.

U.S. Pat. No. 3,125,375 discloses a safety seat harness for passengers in a vehicle comprising a lap belt and shoulder belts, all connected to an anchor strap which is anchored to the floor of the vehicle behind the seat.

The restraint device in accordance with the present invention provides an improved quick release mechanism to rapidly release a prisoner, or other restrained person, animal or object in the event it becomes necessary to move whatever is restrained out of the vehicle or other structure very rapidly for reasons of safety or other emergency. It includes an elongated sleeve slidably mounted on the restraint strap to hold folds of the strap which form the anchor loop within the sleeve at which time the anchor loop cannot be undone. When quick release is desired, the sleeve is slidingly moved away from the folds of the strap whereupon they can be separated thereby undoing the anchor loop and enabling removal of the prisoner or whatever is being restrained. Velcro strips are also provided to releasably hold the fold which forms the anchor loop to the strap.

SUMMARY OF THE INVENTION

It is an object of the invention to provide a quick release restraint device which has a quick release structure that does not require buckles or other rigid fastening devices with a rigid latch mechanism which has to be manipulated in order to unfasten for release, but utilizes instead folds of the restraint strap itself to form an anchor loop and a slidable sleeve to hold the folds together to prevent undoing the anchor loop until the person in charge slides the sleeve down to release the folds and to thereby undo the anchor loop for quick release.

BRIEF DESCRIPTION OF THE DRAWING

FIG. 2 is a plan view of the quick release restraint device of FIG. 1, but showing the sleeve member moved to its release position to undo the anchor loop for release of the restraint device from the anchor member to which the anchor loop had been connected.

FIG. 3 is a section view taken on line 3—3 of FIG. 1.

DESCRIPTION OF PREFERRED EMBODIMENT

Figure 1:
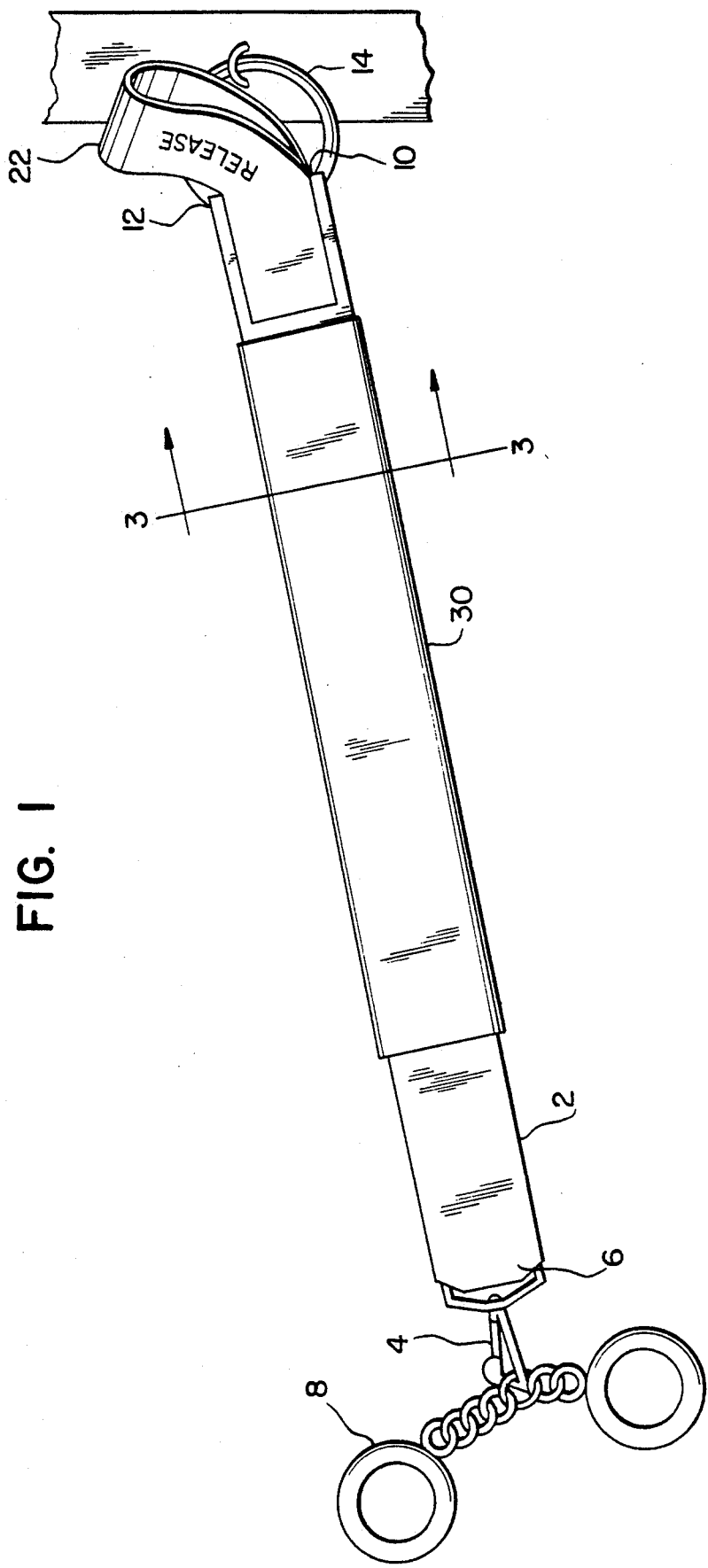
FIG. 1 is a plan view of the quick release restraint device in accordance with this invention showing the sleeve member in its locking position to hold the anchor loop together.
Figure 4:
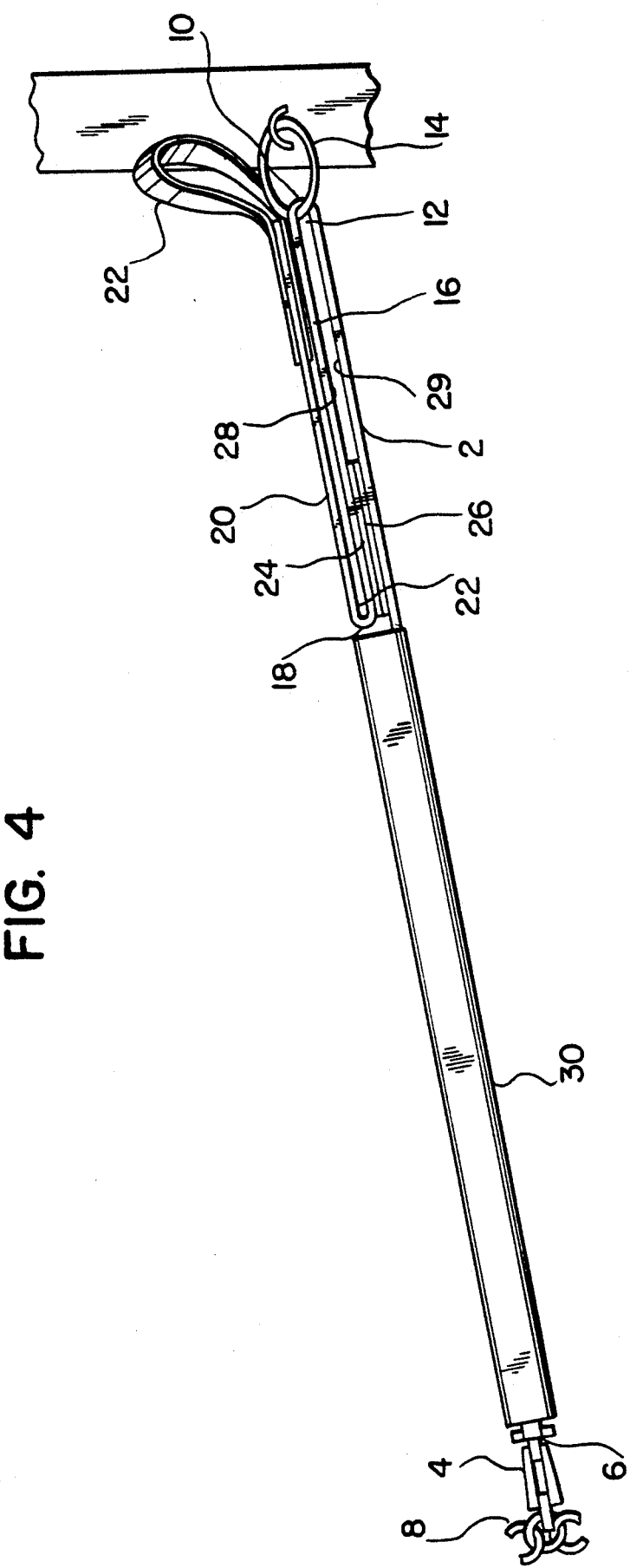
FIG. 4 is a side elevation view of the quick release restraint device of FIG. 1, but showing the sleeve member moved to its release position and the return portions of the strap still in their folded position prior to pulling apart to undo the anchor loop.

A prisoner restraint device in accordance with the present invention includes an elongated restraint strap 2 having a buckle 4 secured at its first end 6 for connecting to the hand cuffs 8 holding a prisoner's hands behind his back while seated in a squad car. The restraint strap 2 extends from its first end 6 to a releasable loop end 10 at which an anchor loop 12 is formed to receive an anchor ring 14 secured to an inner portion of the squad car such as a door post. The anchor ring 14 may be the same one that anchors the seat and shoulder belt restraint of the vehicle.

The anchor loop 12 is formed by a first return portion 16 of the restraint strap 2 which folds at the loop end 10 to form anchor loop 12, is threaded through the anchor ring 14, and then brought forward in the direction toward the first end 6 of the restraint strap 2 overlapping strap 2 for a distance from the loop end 10 of about seven inches.

At such point 18, the first return portion 16 of the restraint strap 2 terminates and joins a second return portion 20 of the restraint strap 2 which folds at point 18 to form a closed loop 22. The second return portion 20 is then brought rearwardly in the direction toward the releasable loop end 10, overlapping the first return portion 16. The second return portion 20 terminates in a hand grasp loop 22 which extends rearwardly beyond the looped end 10, for a person to grasp and pull the first and second return portions apart to undo the anchor loop 12 and enable the restraint strap 2 to slip through and out of the anchor ring 14 when necessary to release the restraint strap 2 from the anchor ring 14.

The first return portion 16 of the restraint strap 2 is held against the overlapped facing portion of restraint strap 2 by a pair of hoop and loop Velcro fastening strips 24 and 26, one of which has outwardly facing hooks and the other has outwardly facing loops for releasable holding engagement when brought together. One of the Velcro fastening strips 24 is secured to the strap facing side 28 of the first return portion 16, extending from the point 18 rearwardly in the direction toward the looped end 10. The other Velcro fastening strip 26 is secured to the return portion facing side 29 of the restraint strap 2, at the location which places Velcro fastening strip 26 in registration with Velcro fastening strip 24 when the anchor loop 12 has been formed and the first return portion 16 has been brought forward to the point 18 where it forms the closed loop 22 and joins the second return portion 20.

When the Velcro fastening strips 24 and 26 are brought together in releasable holding engagement, the first return portion 16 is held in its overlapping relationship with the facing portion of restraint strap 2 and the anchor loop 12 releasably holds the anchor ring 14 to releasably secure the restraint strap thereto.

The first return portion 16 is prevented from pulling away from the facing portion of restraint strap 2 and separating the Velcro fastening strips 24 and 26, and the second return portion 20 is held against the first return portion 16, by an elongate retaining sleeve 30. The elongated retaining sleeve 30 has an elongated through passageway 31 having a cross-sectional shape and dimension corresponding to that of the restraint strap 2 and the overlapped first and second portions 16 and 20 for reception of those items snugly within the through passageway 31 of the retaining sleeve 30.

The retaining sleeve 30 can slide on the restraining strap 2 between an anchor loop locked position wherein the anchor loop 12 cannot be undone to release the restraint strap 2 from the anchor ring 14, and an anchor loop release position wherein the anchor loop can be undone to release the restraint strap 2 from the anchor ring 14.

When in the anchor loop locked position, the first return portion 16, the facing portion of the restraining strap 2, and the second return portion 20 are all held within the through passageway 31 of the sleeve 30. They are held in compressed relationship against the facing portions of each, and the Velcro fastening strips 24 and 26 are likewise held firmly in place against each other. In such position, the anchor loop 12 is securely locked in place and cannot be undone. It holds the restraint strap 2 to the anchor ring 14 received through the anchor loop 12 so a prisoner to whose handcuffs the opposite end of the restraint strap is connected is unable to escape from the squad car.

In the event of an accident or other emergency situation in which the prisoner's life or safety may be threatened if he cannot be gotten out of the squad car quickly, the prisoner restraint device in accordance with this invention provides a quick release mechanism whereby the restraint strap 2 can be quickly released from the anchor ring 14 of the squad car.

The quick release mechanism comprises the elongated retaining sleeve 30 which the officer in charge of the prisoner can quickly slide from its anchor loop locked position to its anchor loop release position. In the anchor loop release position, the retaining sleeve 30 is slidingly moved from the releasable looped end 10 of the restraint strap toward its first end 6 until the first return portion 16 and second portion 20 are outside of the passageway 31 of the retaining sleeve 30. At such time they are free to be pulled away from each other, and the first return portion 16 with its Velcro fastening strip 24 is free to be pulled away from the facing portion of the restraint strap 2 with its Velcro fastening strip 26.

The officer in charge of the prisoner, after sliding the retaining sleeve 30 to its anchor loop release position, then pulls on the hand grasp loop 22 at the outer end of second return portion 20 which pulls the second return portion 20 from first return portion 16, and first return portion 16 with its Velcro fastening strip 24 away from the facing portion of restraint strap 2 with its Velcro fastening strip 26. The first and second return portions 16 and 20 of the restraint strap 2 can then be pulled rapidly through the anchor ring 14 to safely remove the prisoner from the squad car when and if an emergency situation makes that necessary.

The restraint strap 2 is made of a strong flexible material, such as a heavy nylon fabric or the like, which cannot be readily broken or cut but which can be easily folded and unfolded to make the releasable anchor loop 12 and the closed loop 22 between the first and second return portions 16 and 20.

The restraining sleeve 30 is made of a material which can be partially flexible, but rigid enough to securely hold the folded portions of the strap firmly against each other when received within the sleeve. Various types of plastic materials such as vinyl and vinyl copolymers are suitable. Leather may be used. The sleeve may include a thin sheet of metal embedded in the other material, or of metal netting, to resist cutting the sleeve and unintended release of the anchor loop 12 from the anchor ring 14.

The anchor ring 14 may be located on the floor of the vehicle as well as, or as an alternative to, being located along a door or other upper portion of the squad car interior. The floor anchor ring of the squad car's seat belt restraint may be used.

The hand grasp loop 22 is preferably of a bright easily recognizable color such as red so its location can be spotted quickly in the event of an emergency requiring quick release of the restraint device. The word RELEASE may be printed in white or other contrast color on the hand grasp loop 22.

I claim:

1. A quick release restraint device, comprising a flexible restraint strap, said strap having a first end portion to secure to an item to be restrained and a second end portion to releasably connect to an anchor member, fastening means at said first end portion of said restraint strap for securing to said item to be restrained, releasable anchor means at said second end portion of said restraint strap for releasably connecting the second end portion to said anchor member which is spaced apart from said item to be restrained, said releasable anchor means being movable between a connect and hold position and a disconnect and release position, said releasable anchor means comprising a non-metallic, elongated and foldable member of flexible material, and quick lock and release means for quickly locking said releasable anchor means in its said connect and hold position and for quickly releasing said releasable anchor means therefrom to move to its said disconnect and release position, said quick lock and release means being slidable relative to said foldable member, said foldable member and said quick lock and release means being spaced apart from said item to be restrained when said releasable anchor means is connected to said anchor member.

2. A quick release restraint device comprising a flexible restraint strap, fastening means at one end of said restraint strap for securing to an item to be restrained, releasable anchor means at the other end of said restraint strap for releasably connecting the other end to an anchor member, said releasable anchor means being movable between a connect and hold position and a disconnect and release position, and quick lock and release means for quickly locking said releasable anchor means in its said connect and hold position and for quickly releasing said releasable anchor means therefrom to move to its said disconnect and release position, wherein said releasable anchor means is a strap and is integrally formed with said restraint strap, comprising a first return portion overlapping and facing a facing portion, an anchor loop formed between said first return portion and said facing portion, said first return portion being in said connect and hold position when overlapping and facing said facing portion, said first return portion being movable away therefrom to said disconnect and release position, said quick lock and release means being slidable relative to said first return portion of said strap, said first return portion of said strap and said quick lock and release means being spaced apart from said item to be restrained when said releasable anchor means is connected to said anchor member.

3. A quick release restraint device, comprising a flexible restraint strap, fastening means at one end of said restrain strap for securing to an item to be restrained, releasable anchor means at the other end of said restrain strap for releasably connecting the other end to an anchor member, said releasable anchor means being movable between a connect and hold position and a disconnect and release position, and quick lock and release means for quickly locking said releasable anchor means in its said connect and hold position and for quickly releasing said releasable anchor means therefrom to move to its said disconnect and release position, wherein said releasable anchor means is a strap and is integrally formed with said restraint strap, comprising a first return portion overlapping and facing a facing portion, an anchor loop formed between said first return portion and said facing portion, said first return portion being in said connect and hold position when overlapping and facing said facing portion, said first return portion being movable away therefrom to disconnect and release position, wherein said releasable anchor means of said restraint strap integrally formed therewith includes a second return portion overlapping and facing said first return portion, a connecting loop formed between said second return portion and said first return portion spaced apart from said anchor loop, said second return portion extending from said connecting loop in the direction toward said anchor loop, said second return portion terminating at a free end, and hand grasp means on said free end of said second return portion, said quick lock and release means being slidable relative to said first and second return portions of said strap, said first and second return portions of said strap and said quick lock and release means being spaced apart from said item to be restrained when said releasable anchor means is connected to said anchor member.

4. A quick release restraint device, comprising a flexible restraint strap, fastening means at one end of said restraint strap for securing to an item to be restrained, releasable anchor means at the other end of said restraint strap for releasably connecting the other end to an anchor member, said releasable anchor means being movable between a connect and hold position and a disconnect and release position, and quick lock and release means for quickly locking said releasable anchor means in its said connect and hold position and for quickly releasing said releasable anchor means therefrom to move to its said disconnect and release position, wherein said releasable anchor means is a strap and is integrally formed with said restrain strap, comprising a first return portion overlapping and facing a facing portion, an anchor loop formed between said first return and said facing portion, said first return portion being in said connect and hold position when overlapping and facing said facing portion, said first return portion being movable away therefrom to said disconnect and release position, wherein said releasable anchor means of said restraint strap integrally formed therewith includes a second return portion overlapping and facing said first return portion, a connecting loop formed between said second return portion and said first return portion spaced apart from said anchor loop, said second return portion extending from said connecting loop in the direction toward said anchor loop, said second return portion terminating at a free end, and hand grasp means on said free end of said second return portion, wherein said quick lock and release means for quickly locking said releasable anchor means in its said connect and hold position and for quickly releasing said releasable anchor means therefrom to move to its said disconnect and release position comprises an elongated sleeve member slidable on said flexible restraint strap between a locking position and a release position, said sleeve member including an elongated sleeve passageway therethrough, said first and second return portions of said strap and said facing portion of said strap facing said first return portion being received within said sleeve passageway of said sleeve member when it is in its said locking position, said first and second return portions of said strap and said facing portion of said strap facing said first return portion being released from and outside of said sleeve passageway of said sleeve member when it is moved to its said release position.

5. A quick release restraint device as set forth in claim 4, wherein said releasable anchor means includes releasable holding means positioned between said first return portion of said strap and said facing portion of said strap to hold them together when said releasable anchor means is in said connect and hold position and to release them when said releasable anchor means is in said disconnect and release position.

6. A quick release restraint device as set forth in claim 5, wherein said releasable holding means includes a pair of hook and loop fastening strips, a first strip of said pair being on said first return portion of said strap facing said facing portion of said strap, the second strip of said pair being on said facing portion of said strap facing said first return portion and in registration with said first strip of said pair of hook and loop fastening strips when said releasable anchor means is in its said connect and hold position.

7. A quick release restraint device as set forth in claim 4, wherein said hand grasp means on said free end of said second return portion of said strap includes an enlarged strip of fabric material formed in a hand grasp loop.

8. A quick release restraint device as set forth in claim 7, wherein said hand grasp loop on said free end of said second return portion of said strap extends outwardly of said elongated sleeve member when it is in its said locking position.

9. A quick release restraint device as set forth in claim 8, wherein said hand grasp loop includes attention getting means to attract attention to its location quickly for grasping and pulling thereon to assist and facilitate quick release of said restraint device in the event of an emergency.

10. A quick release restraint device as set forth in claim 9, wherein said attention getting means comprises a bright color on said hand grasp loop.

11. A quick release restraint device as set forth in claim 9, wherein said attention getting means comprises visual identification markings on said hand grasp loop which signify that it is to be used for release.

* * * * *